United States Patent
Shin

(10) Patent No.: US 10,826,299 B2
(45) Date of Patent: Nov. 3, 2020

(54) GRID-CONNECTED INVERTER SYSTEM HAVING SEAMLESS SWITCHING

(71) Applicants: ENERGYPARTNERS CO., LTD., Seoul (KR); Young Cheol Shin, Seoul (KR)

(72) Inventor: Young Cheol Shin, Seoul (KR)

(73) Assignees: ENERGYPARTNERS CO., LTD., Seoul (KR); Young Cheol Shin, Seoul (KR)

( * ) Notice: Subject to any disclaimer, the term of this patent is extended or adjusted under 35 U.S.C. 154(b) by 183 days.

(21) Appl. No.: 16/102,717

(22) Filed: Aug. 13, 2018

(65) Prior Publication Data
US 2019/0052097 A1    Feb. 14, 2019

(30) Foreign Application Priority Data

Aug. 14, 2017    (KR) .................. 10-2017-0102966

(51) Int. Cl.
*H02J 3/46*    (2006.01)
*H02J 9/06*    (2006.01)

(52) U.S. Cl.
CPC ............ *H02J 3/46* (2013.01); *H02J 9/061* (2013.01); *H02J 9/062* (2013.01)

(58) Field of Classification Search
CPC .... H02J 3/46; H02J 9/061; H02J 9/062; H02J 9/06
See application file for complete search history.

(56) References Cited

U.S. PATENT DOCUMENTS

| 2015/0280597 A1* | 10/2015 | Takase ................. H02M 1/12 323/271 |
| 2017/0201096 A1* | 7/2017 | Lee .................... H02M 1/10 |
| 2018/0109217 A1* | 4/2018 | Lee .................... H02P 21/0089 |

FOREIGN PATENT DOCUMENTS

| JP | 10-14128 | 1/1998 |
| KR | 10-1178393 | 8/2012 |
| KR | 10-1646170 | 8/2016 |
| KR | 10-1735749 | 5/2017 |

OTHER PUBLICATIONS

Notice of Allowance dated Mar. 2, 2018 for Korean Patent Appl. No. 10-2017-0102966 and its English machine translation by Global Dossier.
Notice of Final Rejection dated Nov. 16, 2017 for Korean Patent Appl. No. 10-2017-0102966 and its English machine translation by Global Dossier.
Notification of Reason for Refusal dated Sep. 20, 2017 for Korean Patent Appl. No. 10-2017-0102966 and its English machine translation by Global Dossier.

* cited by examiner

*Primary Examiner* — Robert L Deberadinis
(74) *Attorney, Agent, or Firm* — Ladas & Parry, LLP

(57) ABSTRACT

A grid-connected inverter system having a seamless switching function. An inverter converts DC power into AC power. A breaker is connected between the inverter, a grid, and a load to switch between a grid-connected operation and an independent operation. A filter converts an output of the inverter into a sine wave. A controller operates the inverter in a current control mode or a voltage control mode. The controller operates the inverter in the current control mode for a period of time longer than a turn-off time of the breaker when an abnormality in the grid is detected, and operates the inverter in the voltage control mode when the grid is disconnected from the load due to turn-off of the breaker.

11 Claims, 9 Drawing Sheets

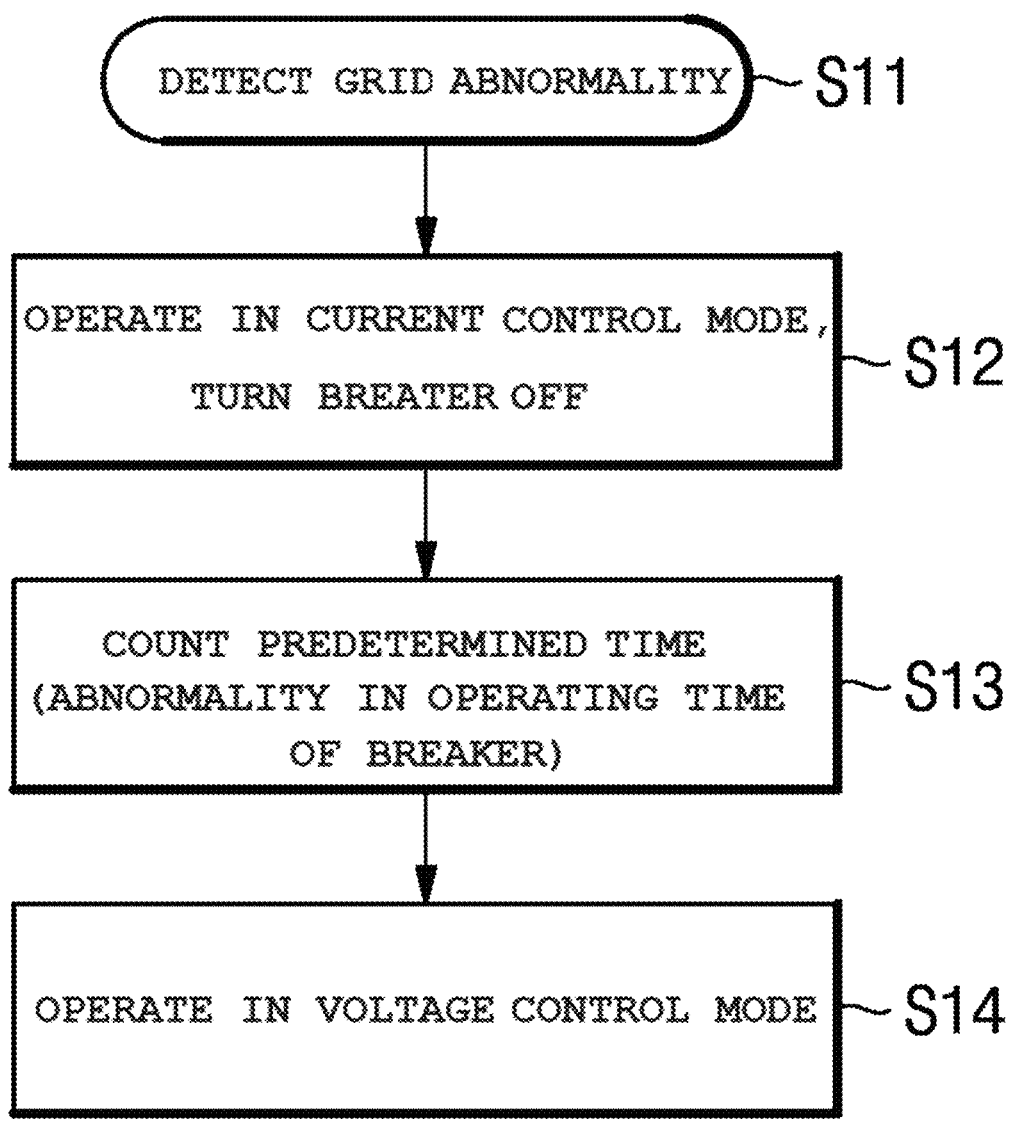

GRID-CONNECTED INVERTER SYSTEM HAVING SEAMLESS SWITCHING

CROSS REFERENCE TO RELATED APPLICATION

The present application claims priority to Korean Patent Application Number 10-2017-0102966 filed on Aug. 14, 2017, the entire contents of which are incorporated herein for all purposes by this reference.

BACKGROUND

Field

Exemplary embodiments of the present disclosure relate to a grid-connected inverter system having a seamless switching function.

Description

A grid-connected inverter, such as an uninterruptible power supply (UPS) or an energy storage system (ESS), performs both a grid-connected operation and a load-independent operation. At an occurrence of a system abnormality (e.g. an instantaneous power failure, a power failure, a dip, sag, or a swell), the inverter supplies power generated thereby to a load while interrupting current to the grid. When a breaker, such as a relay or a magnetic connector (MC), is used, the breaker generally operates about 4 ms or later, after an interruption signal is applied. Since seamless switching is impossible due to the switching time exceeding about 4 ms, a UPS or an instantaneous power failure compensation device uses a high-speed semiconductor device, such as an insulated gate bipolar mode transistor (IGBT) or a silicon controlled rectifier (SCR). Such a semiconductor breaker is generally implemented as an SCR having high current capacity. However, the SCR has no self-turn-off ability, and remains turned on unless a reverse bias is applied. Thus, when current interruption is failed, a severe accident may be caused. That is, the semiconductor breaker has the turn-off problem, despite the reduced switching time, while the relay-type low-speed breaker has the problem of a long switching time, although there is no turn-off problem.

Referring to FIG. 1, a configuration of a single-phase grid-connected inverter system is illustrated. In the inverter system illustrated in FIG. 1, an inverter typically has a full-bridge switching structure, and generates an alternating current (AC) output by unipolar or bipolar switching. A filter typically includes an LC filter and an electromagnetic interference (EMI) filter. The filter removes switching ripples and harmonic ripples from inverter outputs, and removes conductive and radio-frequency noise using an EMIT filter. A breaker is a relay-type low-speed breaker, such as a relay or a magnetic connector. The breaker electromagnetically opens and closes a point of contact by actuating a coil, in response to a signal being applied by a controller. Referring to FIG. 2, a configuration of a three-phase grid-connector inverter system is illustrated. The three-phase grid-connector inverter system may be configured as being a three-phase three-wire system or a three-phase four-wire system.

In the related art, as illustrated in FIG. 4A, when a system abnormality is detected, all switches of an inverter are turned off, an interruption signal is applied to a breaker, a predetermined period of time is counted before the breaker turns off, and when the breaker turn off is completed, the switches of the inverter are turned on again, thereby supplying power to a load. In this case, a switching time of at least about 4 ms, in which the supply of power is interrupted, occurs.

The information disclosed in the Background section is only provided for a better understanding of the background and should not be taken as an acknowledgment or any form of suggestion that this information forms prior art that would already be known to a person skilled in the art.

BRIEF SUMMARY

Various exemplary embodiments provide a grid-connected inverter system having a seamless switching function.

More particularly, a solution enabling seamless supply of power having a zero (0) switching time is provided in order to essentially overcome the problem that a switching time is long when a relay-type low-speed breaker is used. Such various exemplary embodiments can be widely used in systems, such as an energy storage system (ESS) and an uninterruptible power supply (UPS), as a solution satisfying both turn-off ability and switching time requirements.

In other words, various exemplary embodiments provide a grid-connected inverter system performing both a grid-connected operation and a load-independent operation, the inverter system being able to seamlessly switch the supply of power at an occurrence of a system abnormality (e.g. instantaneous power failure, power failure, dip, sag, or swell) while interrupting current to the grid. Such various exemplary embodiments can seamlessly switch the supply of power even in the case in which an inexpensive low-speed breaker, such as a relay or a magnetic connector (MC), is used instead of a high-speed semiconductor device, such as a silicon controlled rectifier (SCR).

According to an aspect, a grid-connected inverter system having a seamless switching function may include: an inverter converting DC power into AC power; a breaker connected between the inverter, a grid, and a load to switch between a grid-connected operation and an independent operation; a filter converting an output of the inverter into a sine wave; and a controller operating the inverter in a current control mode or a voltage control mode, wherein the controller operates the inverter in the current control mode for a period of time longer than a turn-off time of the breaker when an abnormality in the grid is detected, and operates the inverter in the voltage control mode when the grid is disconnected from the load due to turn-off of the breaker.

The controller may include a current controller using zero or a current of the load as a current reference. The controller may further include a phase-locked loop. Here, the controller may obtain a phase and a magnitude of a voltage of the grid, using the phase-locked loop, before detection of the abnormality in the grid, and determine a final output voltage reference by adding a value, obtained by multiplying the phase and the magnitude obtained using the phase-locked loop, to an output value of the current controller. The controller may stop operation of the phase-locked loop until the grid is disconnected from the load due to turn-off of the breaker after detection of the abnormality in the grid. Here, the controller may obtain the phase of the voltage by free-running of the phase-locked loop, set the magnitude of the voltage to be equal to a magnitude of a rated voltage, and determine the final output voltage reference by adding the value, obtained by multiplying the phase and the magnitude, to the output value of the current controller. The controller may further include a voltage controller. Here, after the grid is disconnected from the load due to turn-off of the breaker, the controller may use a value, obtained by free-running of the phase-locked loop after the grid is disconnected from the load due to turn-off of the breaker, as a reference of the voltage controller.

The controller may include a D-axis current controller and a Q-axis current controller. Here, each of the D-axis current controller and the Q-axis current controller may use zero or a current of the load as a current reference. The controller may further include a phase-locked loop. Here, the controller may obtain a phase and a magnitude of a voltage of the grid, using the phase-locked loop, before detection of the abnormality in the grid, D-Q convert three-phase current, input the D-Q converted current to the D-axis current controller and the Q-axis current controller, and determine a final output voltage reference by adding a value, obtained by multiplying the phase and the magnitude, to an output value of the D-axis current controller.

Various exemplary embodiments provide a grid-connected inverter system having a seamless switching function. More particularly, various exemplary embodiments provide a solution enabling seamless supply of power having a zero switching time is provided in order to essentially overcome the problem that a switching time is long when a relay-type low-speed breaker is used. Such various exemplary embodiments can be widely used in systems, such as an ESS and a UPS, as a solution satisfying both turn-off ability and switching time requirements. In other words, various exemplary embodiments provide a grid-connected inverter system performing both a grid-connected operation and a load-independent operation, the inverter system being able to seamlessly switch the supply of power at an occurrence of a system abnormality (e.g. instantaneous power failure, power failure, dip, sag, or swell) while interrupting current to the grid. Such various exemplary embodiments can seamlessly switch the supply of power even in the case in which an inexpensive low-speed breaker, such as a relay or an MC, is used instead of a high-speed semiconductor device, such as an SCR.

Described in more detail, exemplary embodiments provide a solution by which the grid-connected inverter system can perform seamless switching by setting a switching time, associated with interruption of current to the grid and conversion to an independent operation at an occurrence of an abnormality in the grid, to be 0. Even in the case in which the breaker is implemented as a low-speed breaker, such as a relay or an MC, the switching time can be set to be 0. It is therefore possible to overcome the problem that cannot be overcome by the related-art inverter system requiring a short switching time of 4 ms or shorter. Since the semiconductor breaker, such as an SCR, is not used, the danger resulting from the failure of current interruption by the SCR semiconductor breaker can be essentially overcome. In addition, exemplary embodiments can be widely used in systems, such as an ESS, a UPS, and instantaneous power failure compensation device, in which a switching operation in connection with the grid is required.

BRIEF DESCRIPTION OF THE DRAWINGS

The above and other objects, features and advantages of the present disclosure will be more clearly understood from the following detailed description when taken in conjunction with the accompanying drawings, in which:

FIG. 4B illustrates a flowchart of a power switching algorithm according to an exemplary embodiment;

DETAILED DESCRIPTION

Figure 1:
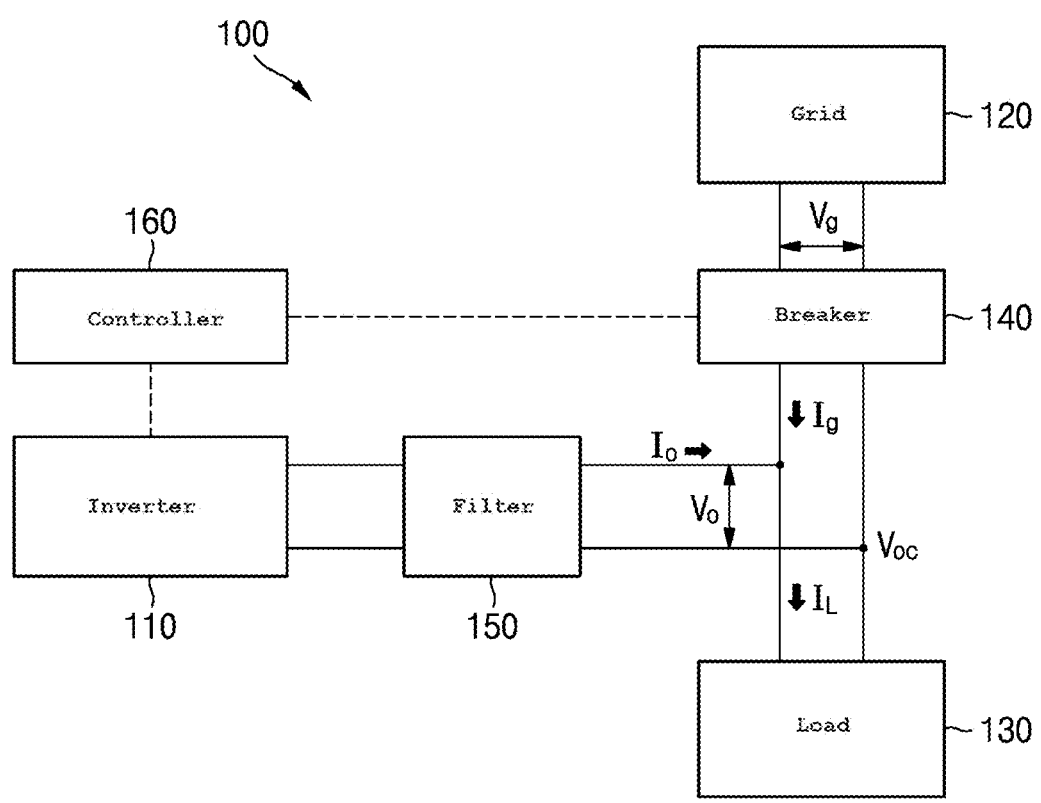
FIG. 1 illustrates a configuration of a single-phase grid-connected inverter system.

Hereinafter, exemplary embodiments will be described in detail with reference to the accompanying drawings.

Exemplary embodiments set forth herein are provided for illustrative purposes to fully convey the concept of the present disclosure to a person skilled in the art. The present disclosure should not be construed as being limited to these embodiments and may be embodied in many different forms. Rather, these embodiments are provided so that the present disclosure will be thorough and complete, and will fully convey the concept of the present disclosure to a person skilled in the art.

In the drawings, the thickness and dimensions of layers may be exaggerated for clarity and the same reference numerals are used throughout. The term "and/or" used herein includes at least one, or combinations, of corresponding items. In addition, it will be understood that when an element is referred to as being "connected to" or "coupled to" another element, not only can it be "directly connected or coupled to" the other element, but it can also be "indirectly connected or coupled to" the other element via an "intervening" element.

A variety of terms used herein should be interpreted as being used to describe specific embodiments but to not limit the present disclosure. Descriptions of components in the singular form are intended to include descriptions of components in the plural form, unless explicitly described to the contrary. It will be understood that the terms "comprise," "include," "have," and any variations thereof used herein are intended to cover non-exclusive inclusions of shapes, numbers, steps, operations, members, components, and/or groups thereof, described herein, unless explicitly described to the contrary In addition, the controller and/or other related devices or components according to exemplary embodiments may be implemented as hardware, firmware (e.g. application specific integrated circuit (ASIC)), software, or any combination thereof. For example, a variety of components of the controller and/or other related devices or components may be provided on a single integrated circuit (IC) chip or separate IC chips. In addition, a variety of components of the controller may be provided on a flexible printed circuit (FPC) film, or may be provided on a tape carrier package, a printed circuit board (PCB), or a substrate the same as the controller. Furthermore, a variety of components of the controller may be a process or thread executable by one or more processors in one or more computing devices, which can execute computer program instructions and work in concert with other components in order to perform a variety of functions described later. For example, the computer program instructions may be stored in memory, such as random access memory (RAM), readable by computing devices using standard memory devices. In addition, the computer program instructions may be stored in a non-transitory computer readable medium, such as a compact disc read-only memory (CD-ROM) or a flash drive. A person skilled in the art will understand that functions of a variety of computing devices may be combined together or may be integrated into a single computing device, or functions of a specific computing device may be distributed to one or more other computing devices without departing from the scope of exemplary embodiments.

Hereinafter, exemplary embodiments of the present disclosure will be described with reference to FIGS. 1 to 6 in order to fully convey the concept of the present disclosure.

Figure 2:
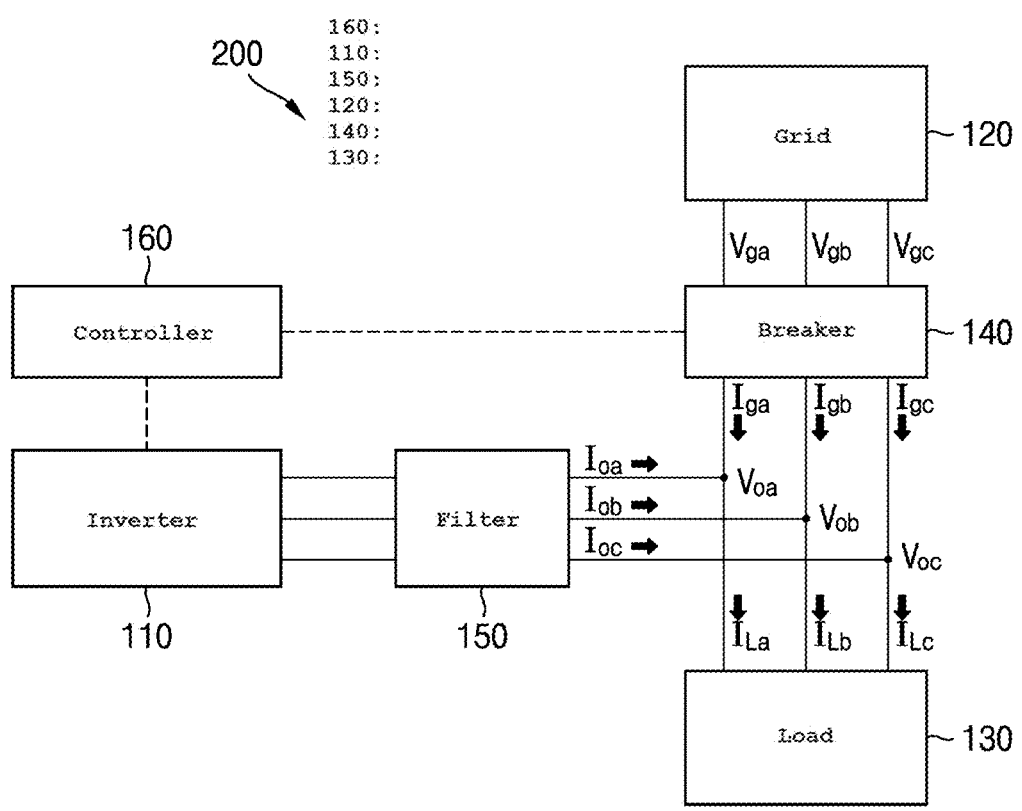
FIG. 2 illustrates a configuration of a three-phase grid-connected inverter system.

FIG. 1 illustrates a configuration of a single-phase grid-connected inverter system 100, while FIG. 2 illustrates a configuration of a three-phase grid-connected inverter system 200.

As illustrated in FIGS. 1 and 2, each of inverter systems 100 and 200 includes: an inverter 110 converting direct current (DC) power into alternating current (AC) power; a breaker 140 connected between the inverter 110, a grid 120, and a load 130 to switch between a grid-connected operation and an independent operation; a filter 150 filtering power output from the inverter 110 into sine waves; and a controller 160 operating or controlling the inverter 110 in a current control mode or a voltage control mode.

Here, a DC power source connected to the inverter 110 may be, but is not limited to, a renewable energy source, such as sunlight or wind power, or a storage energy source, such as a battery or a super capacitor. The DC power source may include a battery management system that manages a battery.

The inverter 110 can perform both a grid-connected operation and an independent operation. The inverter 110 is connected between the load 130 and the grid 120 in the case of grid connection performed by the breaker 140. When current to the grid 120 is interrupted by the breaker 140, the inverter 140 is connected to the load 130 alone. The inverter 110 may be provided as a microgrid or a smartgrid, depending on the size and magnitude.

When the inverter 110 is disconnected from the grid 120, the inverter 110 independently operates, connected to the load 130 alone by a switching device, such as an insulate gate bipolar transistor (IGBT), or a bipolar junction transistor (BJT).

As described above, when the grid 120 is in an ordinary state, the breaker 140 causes all of the grid 120, the load 130, and the inverter 110 to be electrically connected. When the grid 120 is in an abnormal state, the grid 120 and the load 130 are caused to be electrically disconnected. Such an operation of the breaker 140 can be controlled by the controller 160.

The filter 150 may include an inductor and a capacitor (not shown) connected in parallel to the inverter 110. That is, the filter 150 may include an LC filter. The filter 150 generates an output the same as or similar to a sine wave by removing pulse width modulation (PWM) switching components from output components of the inverter 110.

In addition, the filter 150 may further include a variable filter having variable capacity, under the control of the controller 160. For example, when the inverter 110 operates in the current control mode (i.e. operates in connection with the grid 120), the inverter 110 can have lower capacity. This can consequently prevent loss due to LC resonance and provide an efficient operation. In another example, when the inverter 110 operates in the voltage control mode (i.e. operates separately from the grid 120), the filter 150 causes the inverter 110 to have higher capacity. This can rapidly stabilize a transient state in the process of conversion from the current control mode to the voltage control mode and prevent degradations in the quality of power due to rapid changes in the load 130.

As described above, the controller 160 can control the inverter 110, the breaker 140, and/or the filter. In particular, the controller 160 controls the inverter 110 to operate in the current control mode and/or the voltage control mode. That is, the controller 160 controls the inverter 110 to operate in the current control mode when an abnormality in the grid 120 is detected, and controls the inverter 110 to operate in the voltage control mode when the grid 120 and the load 130 are completely disconnected.

In addition, the controller 160 may set different switching frequencies depending on whether the inverter 110 operates in the current control mode or the voltage control mode. For example, when the inverter 110 operates in the current control mode, the controller 160 may set a high switching frequency to the inverter 110, thereby further improving the quality of power supplied to the load 130 during the independent operation.

Figure 3:
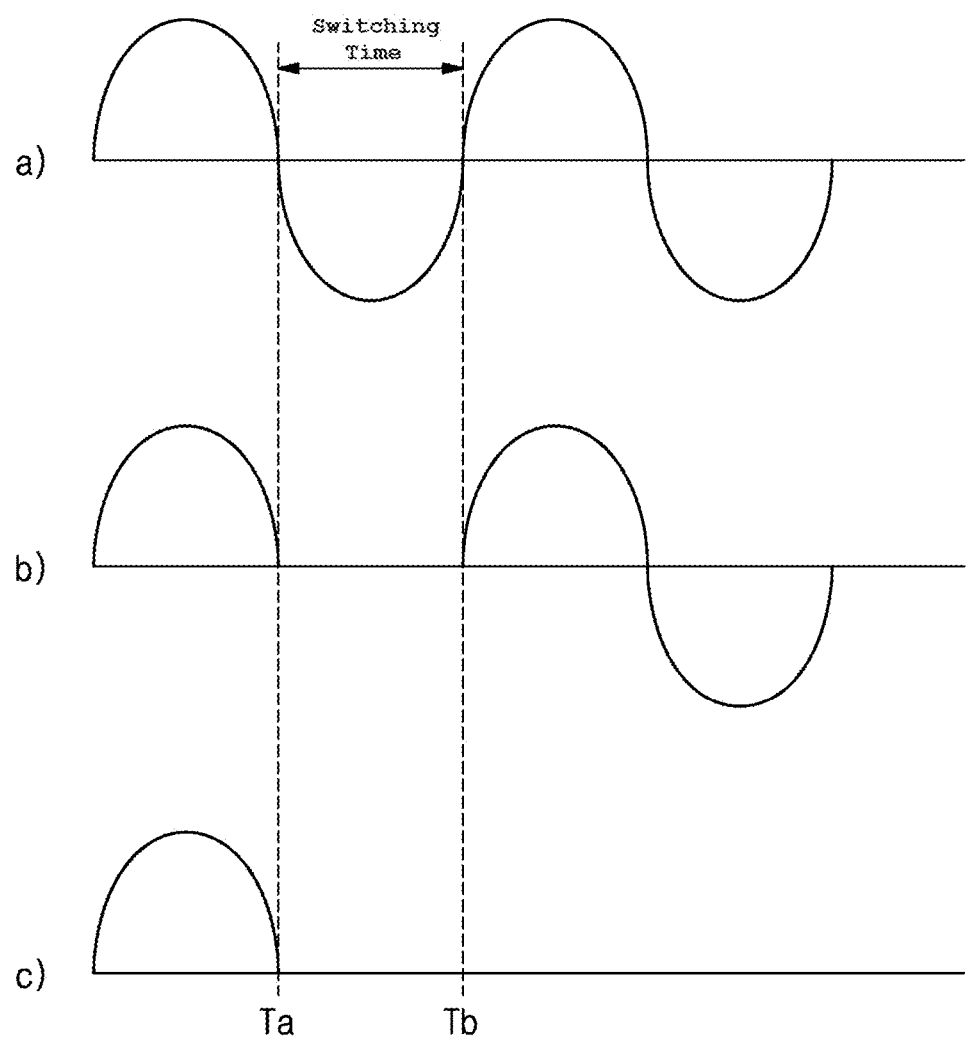
FIG. 3 illustrates a waveform diagram of the inverter system in the case of a power failure in the grid, in which a) indicates an output voltage waveform of the inverter system according to an exemplary embodiment, b) indicates an output voltage waveform of an inverter system of the related art, and c) indicates a grid voltage waveform.

FIG. 3 illustrates a waveform diagram of the inverter system 100 or 200 in the case of a power failure in the grid. Referring to FIG. 3, a) indicates an output voltage waveform of the inverter system 100 or 200 according to an exemplary embodiment, b) indicates an output voltage waveform of an inverter system of the related art, and c) indicates a grid voltage waveform. In addition, in FIG. 3, the X axis (i.e. horizontal axis) indicates a time, while the Y axis (i.e. vertical axis) indicates a phase.

More specifically, in FIG. 3, c) indicates the voltage waveform of the grid 120 when a power failure occurs at a point in time Ta, b) indicates the output waveform that is discontinuous during a half-period switching time in the related art, and a) indicates the output waveform that is seamlessly switched when the inverter system 100 according to the present embodiment is used. That is, according to the present embodiment, a voltage/current is seamlessly supplied to the load 130 during the switching time.

Figure 4A:
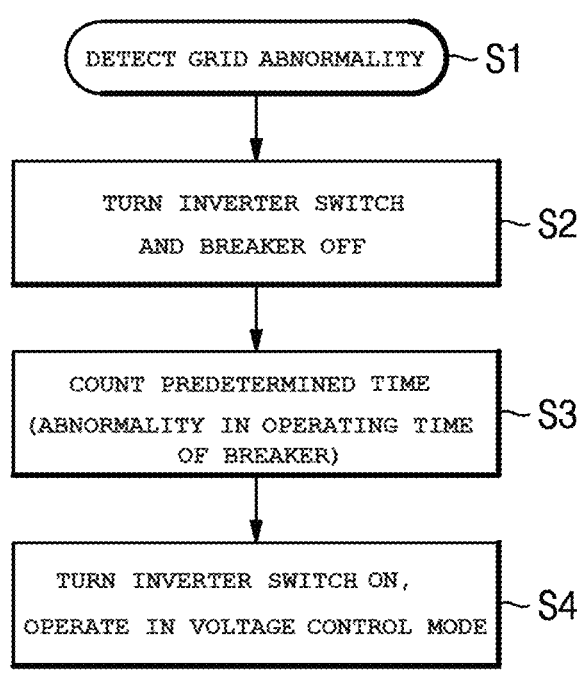
FIG. 4A illustrates a flowchart of a power switching algorithm of the related art.

FIG. 4A illustrates a flowchart of a power switching algorithm of the related art, while FIG. 4B illustrates a flowchart of a power switching algorithm according to an exemplary embodiment.

In the related art, as illustrated in FIG. 4a, the inverter system sequentially performs step S1 of detecting a grid abnormality, step S2 of turning an inverter switch off and turning the breaker off, S3 step of counting a predetermined time (abnormality in the operating time of the breaker), step S4 of turning the inverter switch on (operation in a voltage control mode). In contrast, as illustrated in FIG. 4B, the inverter system having a seamless switching function according to the present embodiment sequentially performs step S11 of detecting a grid abnormality, step S12 of turning the breaker off during operation in a current control mode, step S13 of counting a predetermined time abnormality in the operating time of the breaker), and step S14 of operating in a voltage control mode.

When an abnormality in the grid 120 is detected, the inverter systems 100 and 200 according to the present embodiment remain operating in the current control mode without turning the switch of the inverter 110 off, and are converted to and operate in the voltage control mode when the circuit is completely disconnected due to the operation of the breaker 140.

Due to this difference, the inverter systems 100 and 200 according to the present embodiment have a shorter switching time even in the case in which a relay-type low-speed breaker is used. That is, the inverter systems 100 and 200 according to the present embodiment seamlessly supply power with a zero (0) switching time. In addition, the inverter systems 100 and 200 according to the present embodiment can be widely used in a system, such as an energy storage system (ESS) or an uninterruptible power supply (UPS), as a solution satisfying both turn-off ability and switching time requirements.

Such features will be described in more detail.

Figure 5A:
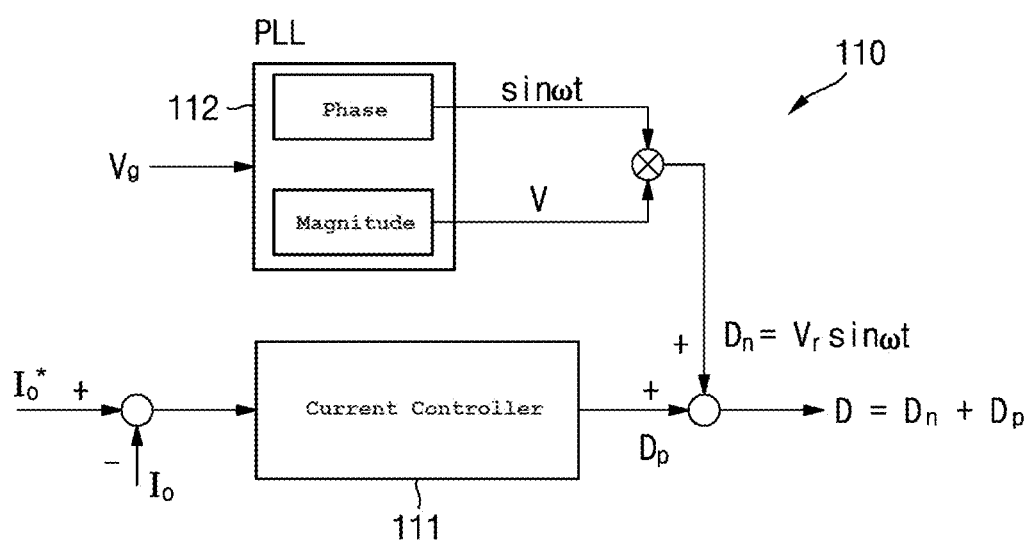
FIGS. 5A, 5B, and 5C are block diagrams illustrating segment-specific operations in a control flow of a single-phase inverter system according to an exemplary embodiment.
Figure 5B:
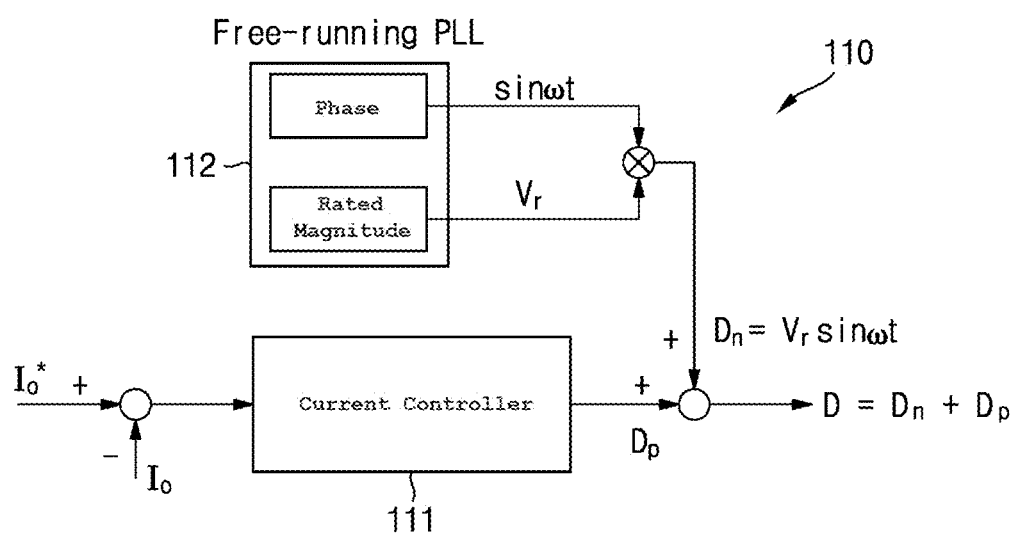
Figure 5C:
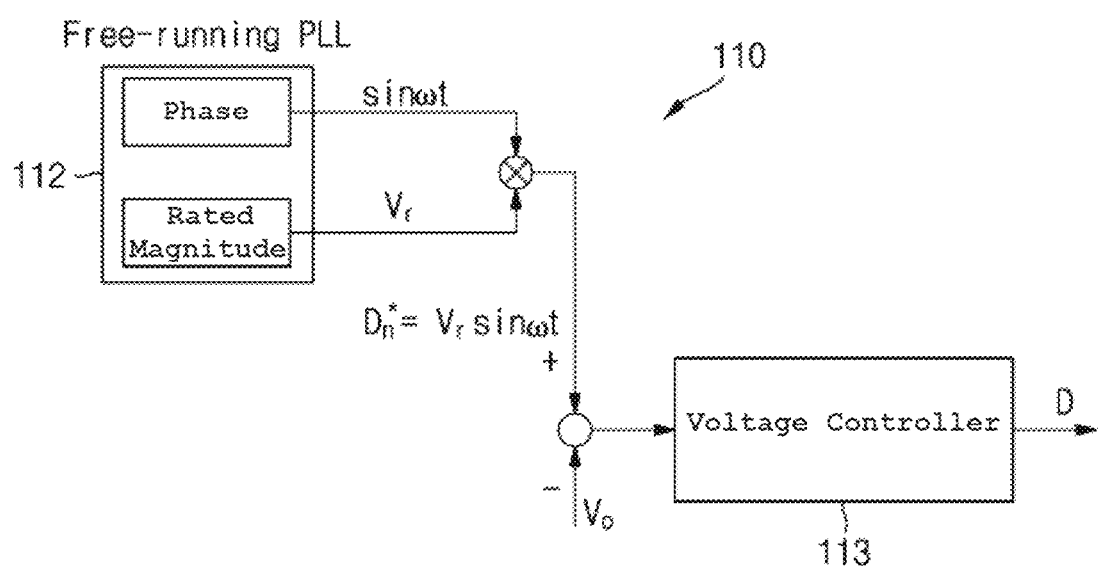

FIGS. 5A, 5B, and 5C are block diagrams illustrating segment-specific operations in a control flow of the single-phase inverter system 100 according to an exemplary embodiment.

In FIGS. 5A to 5C, FIG. 5A illustrates an operation in the segment before the point in time Ta in FIG. 3, FIG. 5B illustrates an operation in the Ta-Tb segment in FIG. 3, and FIG. 5C illustrates an operation in the segment after the point in time Tb in FIG. 3.

First, as illustrated in FIG. 5A, the controller 160 of the single-phase inverter system 100 according to the present embodiment may further include a current controller 111 and a phase-locked loop 112.

In addition, before the point in time Ta, the controller 160 operates in a current control mode to charge or discharge electricity from or to the grid 120.

In this regard, the current controller 111 may use zero (0) current or the current of the load 130 as a current reference. This may be adjusted by tuning so as to minimize the transient state of a voltage waveform.

In addition, the phase-locked loop 112 acts to obtain components of a phase sin ωt and a magnitude V of a voltage Vg of the grid 120 before detection of an abnormality in the grid 120.

Furthermore, the controller 160 determines a final output voltage reference $D=D_n+D_p$ by adding a value $D_n=V \sin \omega t$, obtained by multiplying the phase and the magnitude obtained using the phase-locked loop 112, to an output value $D_p$ of the current controller 111.

Afterwards, as illustrated in FIG. 5B, in the transient state from the point in time Ta to the point in time Tb in which the breaker 140 is turned off after detection of an abnormality in the grid 120, the controller 160 stops the operation of the phase-locked loop 112 using the voltage Vg of the grid 120 since the supply of power to the grid 120 is stopped. Here, the controller 160 obtains the phase sin ωt of the voltage by free running of the phase-locked loop 112 (generating a phase having a predetermined period corresponding to the frequency of the grid 120), and sets the magnitude Vr of the voltage to be equal to the magnitude of a rated voltage.

In addition, the controller 160 obtains a voltage $D_n=V_r \sin \omega t$ by multiplying the phase sin ωt of the voltage and the magnitude Vr of the rated voltage. Furthermore, the controller 160 determines the final output voltage reference $D=D_n+D_p$ by adding the value $D_n=V \sin \omega t$, obtained by multiplying the phase and the magnitude obtained as described above, to the output value $D_p$ of the current controller 111

Finally, as illustrated in FIG. 5C, the controller 160 further includes a voltage controller 113. After the breaker 140 is turned off (after the point in time Tb), the controller 160 operates the inverter 110 in the voltage control mode to supply power to the load 130 by independent operation.

In this case, the controller 160 uses a value $V_0^*=V_r \sin \omega t$, obtained by the free running of the phase-locked loop 112, as the reference D of the voltage controller 113.

As set forth above, at an occurrence of an abnormality in the grid 120, the grid-connected inverter system 100 according to an exemplary embodiment enables seamless switching by setting a switching time, associated with interruption of current to the grid 120 and conversion to an independent operation, to be zero (0). Even in the case in which the breaker (or circuit breaker) is implemented as a low-speed breaker, such as a relay or a magnetic connector (MC), the switching time can be set to be 0. It is therefore possible to overcome the problem that cannot be overcome by the related-art inverter system requiring a short switching time of 4 ms or shorter. Since the semiconductor breaker, such as an SCR, is not used, the danger resulting from the failure of current interruption by the SCR semiconductor breaker can be essentially overcome.

Figure 6:
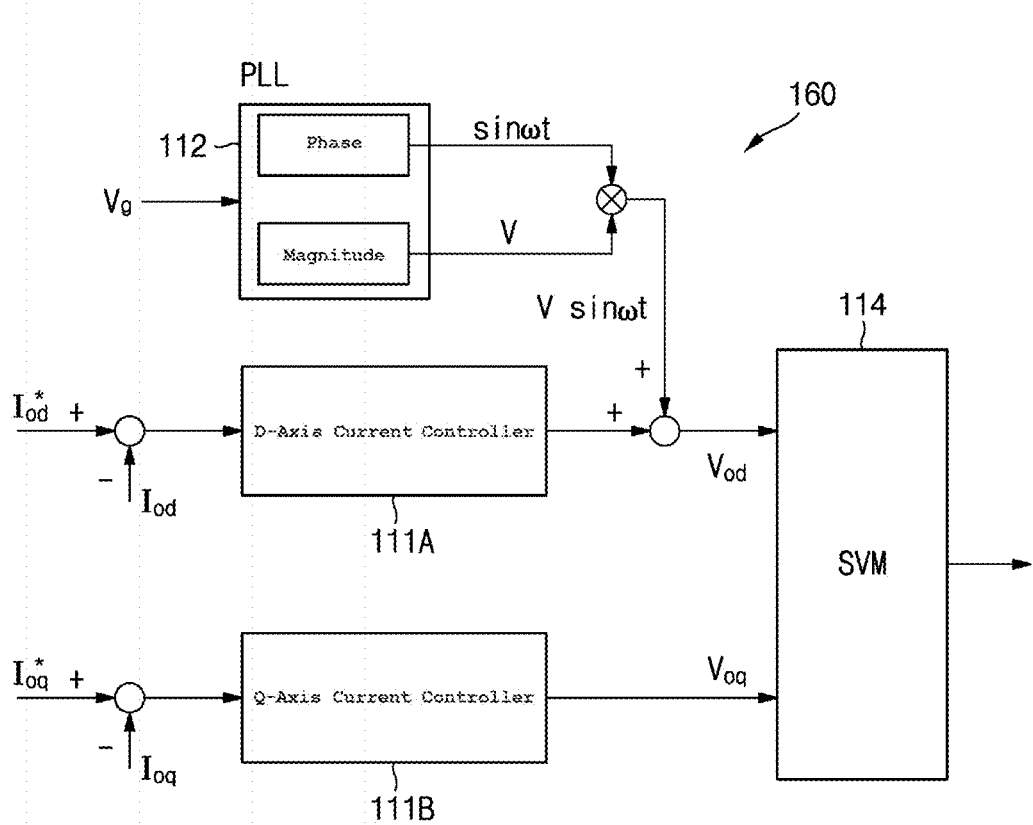
FIG. 6 is a block diagram illustrating a control flow of a three-phase inverter system according to an exemplary embodiment.

FIG. 6 is a block diagram illustrating a control flow of the three-phase inverter system 200 according to an exemplary embodiment.

As illustrated in FIG. 6, the three-phase inverter system 200 according to the present embodiment has a configuration similar to that of the single-phase inverter system 100. Thus, in the three-phase inverter system 200, the controller 160 includes the current controller 111A and 111B and the phase-locked loop 112. However, the current controller is comprised of a D-axis current controller 111A and a Q-axis current controller 111B.

Each of the D-axis current controller 111A and the Q-axis current controller 111B uses zero (0) current or the current of the load 130 as a current reference.

In the controller 160 having the above-described configuration, the phase sin ωt and the magnitude V of the voltage $V_g$ of the grid 120 are obtained using the phase-locked loop 112 before detection of an abnormality in the grid 120, three-phase current is D-Q converted before being input to the D-axis current controller 111A and the Q-axis current controller 111B, and an output voltage reference is determined by adding a value V sin ωt, obtained by multiplying the phase and the magnitude, to an output value of the D-axis current controller 111A. The output voltage reference, obtained as above, is provided to a space vector modulator (SVM) 114.

The foregoing descriptions of the exemplary embodiments have been presented in order to explain the grid-connected inverter system having a seamless switching function according to the present disclosure. A person skilled in the art to which the present disclosure relates could make various modifications and variations without departing from the principle of the present disclosure, as defined by the appended Claims.

What is claimed is:

1. A grid-connected inverter system comprising:
an inverter converting DC power into AC power;
a breaker connected between the inverter, a grid, and a load to switch between a grid-connected operation and an independent operation;
a filter converting an output of the inverter into a sine wave, the filter connected between the inverter and the load; and
a controller operating the inverter in a current control mode or a voltage control mode,
wherein the breaker is connected to between the filter and the load, wherein the controller operates the inverter in the current control mode for a period of time longer than a turn-off time of the breaker when an abnormality in the grid is detected, and operates the inverter in the voltage control mode when the grid is disconnected from the load due to turn-off of the breaker, whereby seamless switching is performed, and wherein:
the filter comprises a variable filter having variable capacity including a first capacity and a second capacity according to control of the controller, the filter configured to:
when the inverter operates in the current control mode, have the first capacity to prevent loss due to LC resonance, and
when the inverter operates in the voltage control mode, have the second capacity larger than the first capacity to stabilize a transient state during conversion from the current control mode to the voltage control mode, and
the inverter is configured to operate at a first switching frequency or a second switching frequency according to the control of the controller, the inverter configured to:
when the inverter operates in the current control mode, operate at the first switching frequency, and
when the inverter operates in the voltage control mode, operate at the second switching frequency higher than the first switching frequency.

2. The grid-connected inverter system according to claim 1, wherein the controller comprises a current controller using zero or a current of the load as a current reference.

3. The grid-connected inverter system according to claim 2, wherein the controller further comprises a phase-locked loop, and
the controller obtains a phase and a magnitude of a voltage of the grid, using the phase-locked loop, before detection of the abnormality in the grid, and determines a final output voltage reference by adding a value, obtained by multiplying the phase and the magnitude obtained using the phase-locked loop, to an output value of the current controller.

4. The grid-connected inverter system according to claim 3, wherein the controller stops operation of the phase-locked loop until the grid is disconnected from the load due to turn-off of the breaker after detection of the abnormality in the grid, and
the controller obtains the phase of the voltage by free-running of the phase-locked loop, sets the magnitude of the voltage to be equal to a magnitude of a rated voltage, and determines the final output voltage reference by adding the value, obtained by multiplying the phase and the magnitude, to the output value of the current controller.

5. The grid-connected inverter system according to claim 4, wherein the controller further comprises a voltage controller, and
after the grid is disconnected from the load due to turn-off of the breaker, the controller uses a value, obtained by free-running of the phase-locked loop after the grid is disconnected from the load due to turn-off of the breaker, as a reference of the voltage controller.

6. The grid-connected inverter system according to claim 1, wherein the controller comprises a D-axis current controller and a Q-axis current controller, wherein each of the D-axis current controller and the Q-axis current controller uses zero or a current of the load as a current reference.

7. The grid-connected inverter system according to claim 6, wherein the controller further comprises a phase-locked loop, and
the controller obtains a phase and a magnitude of a voltage of the grid, using the phase-locked loop, before detection of the abnormality in the grid, D-Q converts three-phase current, inputs the D-Q converted current to the D-axis current controller and the Q-axis current controller, and determines a final output voltage reference by adding a value, obtained by multiplying the phase and the magnitude, to an output value of the D-axis current controller.

8. The grid-connected inverter system according to claim 1, wherein the filter is connected between the inverter and a connection line connecting between the grid and load.

9. The grid-connected inverter system according to claim 1, wherein the filter and the breaker are connected between the inverter and the grid.

10. The grid-connected inverter system according to claim 1, wherein the grid is connected to between the filter and the load through the breaker.

11. A grid-connected inverter system comprising:
an inverter converting DC power into AC power;
a breaker connected between the inverter, a grid, and a load to switch between a grid-connected operation and an independent operation;
a filter converting an output of the inverter into a sine wave; and
a controller operating the inverter in a current control mode or a voltage control mode,
wherein:
the controller operates the inverter in the current control mode for a period of time longer than a turn-off time of the breaker when an abnormality in the grid is detected, and operates the inverter in the voltage control mode when the grid is disconnected from the load due to turn-off of the breaker, whereby seamless switching is performed,
the filter comprises a variable filter having variable capacity including a first capacity and a second capacity according to control of the controller, the filter configured to:
when the inverter operates in the current control mode, have the first capacity to prevent loss due to LC resonance, and
when the inverter operates in the voltage control mode, have the second capacity larger than the first capacity to stabilize a transient state from the current control mode to the voltage control mode, and
the inverter is configured to operate at a first switching frequency or a second switching frequency according to the control of the controller, the inverter configured to:
when the inverter operates in the current control mode, operate at the first switching frequency, and
when the inverter operates in the voltage control mode, operate at the second switching frequency higher than the first switching frequency.

\* \* \* \* \*